RADIATION-HARDENED RECORDING SYSTEM

INVENTORS
FRED G. HEWITT
RAYMOND H. JAMES

BY Thomas J. Nikolai
ATTORNEY

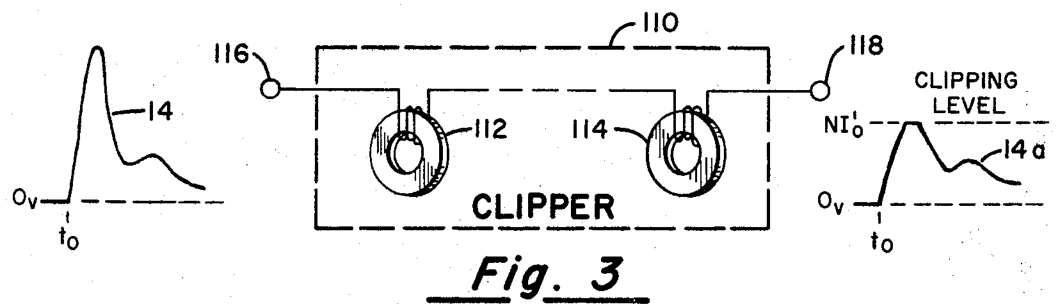
Fig. 3
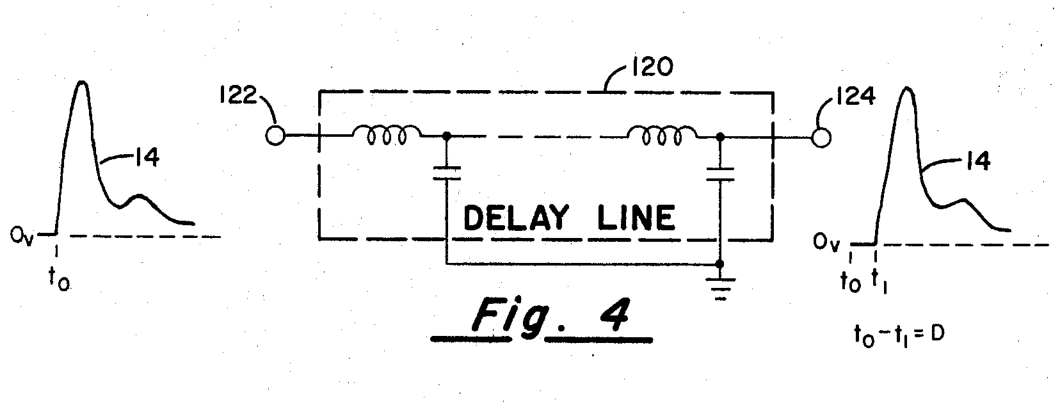
Fig. 4
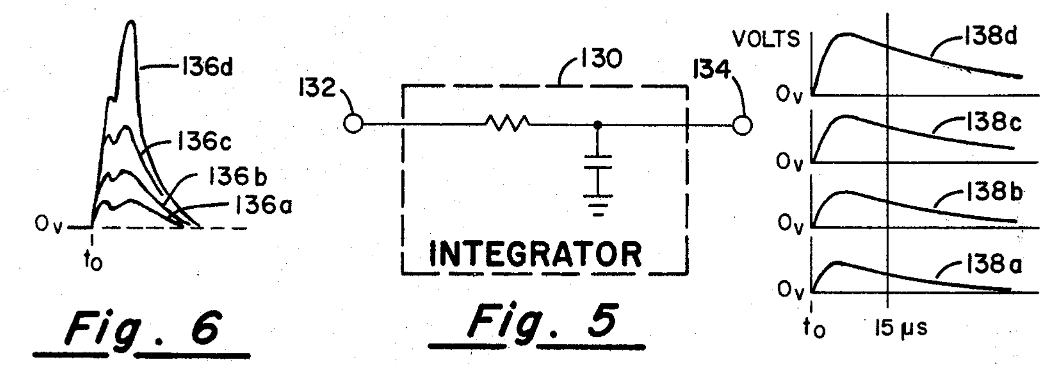
Fig. 6 Fig. 5
Fig. 7
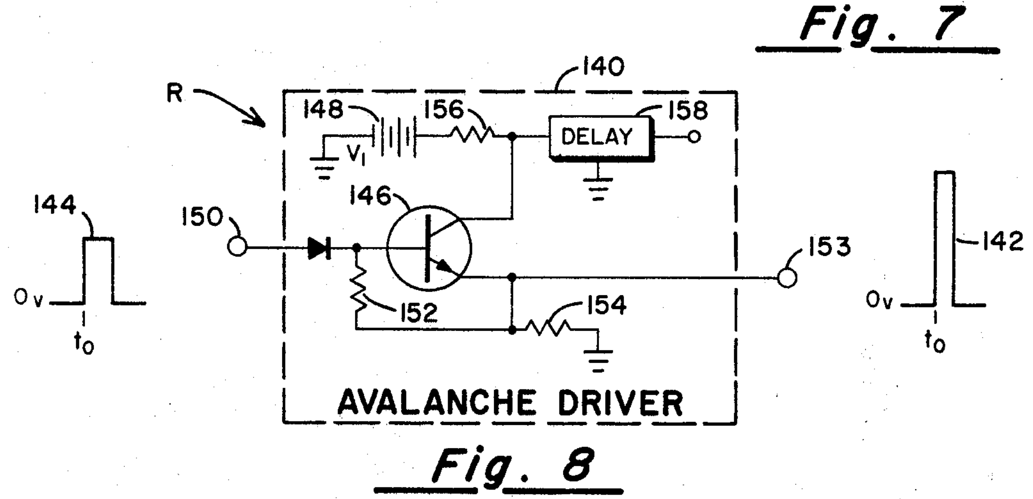
Fig. 8

United States Patent Office 3,432,829
Patented Mar. 11, 1969

3,432,829
RADIATION-HARDENED RECORDING SYSTEM

Fred G. Hewitt, St. Paul, and Raymond H. James, Bloomington, Minn., assignors to Sperry Rand Corporation, New York, N.Y., a corporation of Delaware Filed Oct. 2, 1964, Ser. No. 401,005
U.S. Cl. 340—174 6 Claims
Int. Cl. G11b *5/00;* G01t *1/16;* H01j *39/00*

This invention relates in general to a means of recording a transient phenomenon by sampling at discrete intervals an electrical signal representative of such phenomenon and in particular to such a device whose record is not susceptible to nuclear radiation deterioration. The levels of the transient signal at the discrete sampled intervals are stored in magnetizable memory elements as a function of the degree of the partial switching of the element's magnetic flux. One aspect of the present invention is the provision of a means preventing the inadvertent triggering of the recording of such transient phenomenon by the nuclear radiation rather than by the programmed sampling procedure.

The present invention utilizes magnetizable memory elements as the recording device. Such recording device, or detector, may be of any appropriate design such as that of the following copending patent applications; L. L. Harklau et al., Ser. No. 385,994 filed July 29, 1964, and now Patent No. 3,392,377; F. G. Hewitt, Ser. No. 333,873, filed Dec. 27, 1963, and now Patent No. 3,332,073; R. H. James, Ser. No. 321,909, filed Nov. 6, 1963, now Patent No. 3,373,411, and F. G. Hewitt, Ser. No. 386,823, filed Aug. 3, 1964. The preferred embodiment of the present invention utilizes the detector of the above last named application of F. G. Hewitt, and it includes at least two magnetizable memory elements termed the signal core and the information core. The relatively long duration transient electrical signal that is to be sampled is coupled only to the signal core while the relatively short duration strobe pulse is concurrently, in time, coupled to both the information core and the signal core whereby the strobe pulse performs the function of a flux gate to the coincident sampled portion of the transient signal. The coincident sampled portion of the transient signal that is gated into the signal core causes a corresponding flux change in the magnetic state of the signal core which flux change in turn induces a back EMF in the drive line that couples the strobe pulse to the information core and the signal core. This back EMF effects an apparent increase, or decrease, in the strobe pulse drive line impedance—depending upon the relative polarities of the strobe pulse and the sampled portion of the transient signal—causing an effective decrease, or increase, in the MMF of the strobe pulse as coupled to the information core and the signal core. This effect upon the MMF of the strobe pulse as regards the magnetic state of the information core is a function of the amplitude and polarity of the transient signal sampled portion providing an indication, upon interrogation of the information core, of the amplitude and polarity of the transient signal sampled portion that was coupled to the signal core. The apparatus and method of operation of the memory elements of the recording device utilized in the present invention are more fully disclosed in the copending patent application of L. L. Harklau et al., Ser.

No. 385,994, filed July 29, 1964 and assigned to the same assignee as is the present invention.

In recent years a considerable amount of time and effort has been expended upon the investigation of the effects of nuclear-weapon-burst and simulated-burst radiation on electronic components and semiconductor devices. Such work is principally concerned with the effects due to gamma ray and neutron bombardment of a transient radiation environment. Two reports—REIC Report No. 18, June 1, 1961, and REIC Report No. 26, Apr. 19, 1963, "Radiation Effects Information Center," Battele Memorial Institute, Columbus, Ohio—cover this phase of the effects of nuclear radiation with a listing or probable component degradations. As pointed out in these above referenced reports, transient radiation effects on electronic components and semiconductor devices range from moderate to destructive with magnetic devices being the least susceptible to degraded performance.

Prolonged radiation such as in the immediate proximity of an active reactor affects magnetic properties much the same as prolonged heating. Those materials which owe their distinctive properties to special heat treatments are most rapidly and permanently affected by high energy radiation. Materials such as ferrites which have low Curie temperatures are impaired magnetically if their temperature rises excessively, either due to proximity to a heat source, or to internal conversion of radiant energy into heat. Otherwise, ferrites are notably immune to nuclear radiation damage; due to either temporary or long time exposure.

With a magnetic device as an established radiation-hardened device (i.e., a device whose operating characteristics are substantially unaffected by intense gamma ray and neutron bombardment) the present invention provides a portable recorder that is light-weight, that requires no external power and that may be placed in a transient radiation environment along with the device to be tested. The recorder provides a highly reliable, recoverable record of the measured, or detected phenomenon (i.e., the effect upon the tested device) as a result of exposure to such an environment.

In the preferred embodiment of applicants' invention, a sensor detects, or monitors the effect upon the operating characteristics of the device being tested while both items, the device being tested and the recorder, are in the transient radiation environment. The recorder converts the monitored characteristics, which may be in the form of a transient electrical signal, into discrete data levels, each discrete data level indicative of the level of the signal sampled portion. These discrete data levels are stored in corresponding separate detectors which are preferably magnetic memory elements such as toroidal ferrite cores or transfluxors. Upon cessation of the intense radiation bombardment, the recorder may be removed from the test environment and taken to laboratory-type facilities where the information stored in the detectors is read out and presented in a directly useable form.

In comparison to the method of the detection of transient phenomenon in electronic components and semiconductor devices due to transient radiation effects as made possible by applicants' invention, present day methods are costly and cumbrous. Conventional methods involve the remote recording of such effects by magnetic tape devices and monitor oscilloscopes. However, consider a device to be tested which has, for example, fifty separate effects to be monitored. As each separate effect, or phenomenon, requires a separate recording device, i.e., a separate magnetic tape unit or oscilloscope, such a testing procedure could require the investment of hundreds of thousands of dollars to provide a useful analysis of the effects of the test. Further, frequency response of these recording devices—as the monitored characteristic is a non-cyclical transient electrical signal of microsecond duration—is insufficient to provide an accurate analysis of the initial reaction of the operating characteristics of the tested device to the transient radiation bombardment.

The uncertainty in the knowledge of actual nuclear weapon-burst bombardment radiation spectrum, real-time history and the relative effects of neutrons, gamma rays and neutron-induced gamma rays has made it difficult to calculate vulnerability numbers for simulated effects. Recent developments in effects measurements such as secondary photocurrent in transistors and neutron effects in capacitors have made it even more important to determine the response of components and circuits to an actual weapon radiation environment. Such a determination requires a low-cost recorder that is easily hand-carried and self-contained so that it could be placed in the radiation environment to monitor radiation effects at a plurality of locations from the radiation source. Real-time bunker-installed devices such as magnetic tape units and monitor oscilloscopes with cable connections to radiation sensors have been the only recording devices utilized up to the present time. However, as each item of data to be recorded requires a separate recording device, the use ot such devices requires a near-prohibitive expense. Additionally, the electro-magnetic fields accompanying actual weapon-burst bombardment radiation often causes complete destruction of the monitored signals through adverse effects upon the cabling coupling the monitored signal to the recording device. Consequently, a serious need has developed for a low-cost, portable, real-time recorder that is completely self contained and that requires no radiation shielding. The present invention provides a device whose recorded monitored data is substantially insensitive to a peak gamma-radiation pulse of $10^{10}$ ergs g.$^{-1}$ (C) sec.$^{-1}$ ($10^{10}$ ergs per gram per second references to carbon), thermal shocks below the magnetic storage device's Curie temperature, overpressure, blast, electromagnetic field and ground shock.

Additionally, the effects of high energy electrons of semiconductor devices are currently of great interest because of increasingly frequent exposure of satellite space craft with electronic equipment to the Van Allen radiation belts. The present invention provides a device that could be exposed to such radiation and which would provide a recoverable record of the characteristics of such radiation belts.

Accordingly, it is a primary object of the present invention to provide a portable radiation-hardened recorder of transient phenomena due to intense transient nuclear radiation bombardment.

Another object of the present invention is to provide a recorder whose recorded information is substantially unaffected by gamma ray and neutron bombardment of a transient radiation environment.

Another object of the present invention is to provide a portable radiation-hardened recorder of transient phenomena which utilizes passive delay lines to convert transient electrical input into sampled portions, the amplitudes of the sampled portions defining the waveform.

A further object of the present invention is to provide a portable radiation-hardened recorder which converts a microsecond duration, non-reoccurring, electrical signal into discrete signal amplitudes representative of the electrical signal wave form and stores each such discrete signal in separate detecting means for subsequent readout.

This invention in its preferred embodiment utilizes memory elements of magnetizable material and in particular such elements that store discrete levels of data as a function of the degree of the partial switching of the elements' magnetic flux. Accordingly, a discussion of such elements and their modes of operation is given below.

The value of the utilization of small cores of magnetizable material as logical memory elements in electronic data processing systems is well known. This value is based upon the bistable characteristic of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements which possess the property of nondestructive readout, for by retaining the initial state of remanent magnetization after readout the rewrite cycle required with destructive readout devices is eliminated. As used herein, the term "nondestructive readout" shall refer to the sensing of the state of the remanent magnetization of a magnetizable core without destroying such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a mangetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the switching threshold characteristics of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture, with a transverse interrogate field, i.e., an externally applied field directed across the core's internal flux applied by a second low remanent magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article, "The Transfluxor," Rajchman and Lo, Proceedings of the IRE, March 1956, pp. 321–332. This method utilizes a "transfluxor" which comprises a core of magnetizable material of a substantially rectangular hysteresis characteristic having at least a first larger aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving nondestructive readout of the magnetic memory core is that disclosed in the article "Fluxlock-High Speed Core Memory," Instruments and Control Systems, Robert M. Tillman, May 1961, pp. 866–869. This method utilizes a bistable magnetic toroidal memory core having write and sense windings threading the core's central aperture and an interrogate winding wound about the core along a diameter of the core. Information is stored in the core in the conventional manner. Interrogation is achieved by coupling an interrogate current signal to the interrogate winding causing a temporary alternation of the core's magnetic state. Readout of the stored information is achieved by a bipolar output signal induced in the sense winding, the polarity phase of the readout signal indicating the information stored therein.

One method of achieving a decreased magnetic core switching time is to employ time-limited switching techniques as compared to amplitude-limited switching techniques. In employing the amplitude-limited switching technique, the hysteresis loop followed by a core in cycling its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the praticular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, supplement, vol. 32, No.3, pp. 38S–39S, March 1961, provides excellent background material for the switching technique utilized in the present invention.

The magnetic conditions and their definitions as discussed above may now be itemized as follows:

PARTIAL SWITCHING

Amplitude-limited—condition wherein with a constant drive field amplitude, increase of the drive field duration will cause no appreciable increase in core flux density.

Time-limited—condition wherein with a constant drive field amplitude, increase of the drive field duration will cause appreciable increase in core flux density.

COMPLETE SWITCHING

Saturated—condition wherein increase of the drive field amplitude or duration will cause no appreciable increase in core flux density.

Stable state—condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal is gated by the strobe pulse into a separate magnetic device so that each separate magnetic device stores a flux level representative of the net magnetomotive force effect of the strobe pulse and that portion of the transient signal gated by the strobe pulse. The recorder of the present invention is specifically designed in a modular concept whereby a plurality of detector-delay sets may be added to or deleted from the recorder to accommodate different recording requirements; such increase or decrease in the recording capabilities does not induce a significant loss in strobe pulse form characteristics. Thus, there is provided a highly versatile recording system. The terms "signal," "pulse," "field," etc., when used herein shall be used interchangeably to refer to the current signal that produces the corresponding magnetic field and to the magnetic field produced by the corresponding current signal.

Accordingly, it is a primary object of the present invention to provide a modularized system and method for the sampling of a constant current source transient electrical signal.

It is a further object of the present invention to provide a system and a method for the flux gating of an incremental portion of a constant current source transient electrical signal by a constant current source time-limited strobe pulse.

It is a further object of the present invention to provide a modularized recording system and a method whereby an electrical signal is sampled in a plurality of modular detector-delay sets by a serial strobe pulse wherein the duration of the sampled portion of the electrical signal is determined by the duration of the strobe pulse which duration is substantially unaffected by a variation in the number of detector-delay sets.

It is a further and more general object of the present invention to provide a novel method of operating a magnetizable memory element as an electrical signal sampling device.

As the present invention is concerned with a device for the recording of a transient phenomenon while such device is in a nuclear radiation environment it is desirable that the control circuitry for the programmed sampling procedure be immune to non-programmed triggering, i.e., uncontrolled initiation of the sampling procedure. Accordingly, an additional aspect of the present invention is the provision of a complex strobe generator that is not subject to inadvertent triggering of the recording of the transient phenomenon due to activation by the burst of nuclear radiation but is only triggered by a programmed signal. Such complex strobe generator is comprised of two avalanche mode pulse generators whose outputs are common coupled to the detector means; each generator generates substantially equal but opposite polarity strobe pulses. Such generators are capable of being triggered into avalanche mode operation by a high intensity nuclear radiation burst or by a programmed signal. When triggered by a burst of radiation energy both generators are triggered into the avalanche mode providing equal but opposite polarity cancelling strobe pulses that have no substantial affect upon the magnetization of the coupled detector means. However, when only one of such generators is triggered by a programmed signal such generator couples an appropriate polarity strobe pulse to the coupled detector means effecting therein a storage of that portion of the transient signal that is sampled by the strobe pulse.

Accordingly, it is a further object of the present invention to provide a pulse generator that produces an effective output signal only when triggered by a programmed signal.

It is a still further object of the present invention to provide a pulse generator that includes two avalanche mode pulse generator circuits whose outputs are common coupled and that provide cancelling opposite polarity output strobe pulses upon activation by a high intensity nuclear radiation burst.

It is yet a still further object of the present invention to provide a complex strobe generator that is not subject to inadvertent environmental nuclear radiation burst triggering of the recording of a transient signal in a coupled recording device.

These and other more detailed and specific objects will be disclosed in the course of the following specification, reference being had to the accompanying drawings, in which:

FIG. 3 is an illustration of a magnetic clipper that may be used with the recorder of FIG. 1.

FIG. 4 is an illustration of a delay line that may be used with the recorder of FIG. 1.

FIG. 5 is an illustration of an integrator that may be used with the readout system of FIG. 1.

FIG. 6 illustrates a set of typical readout signal waveforms from the detectors of the recorder of FIG. 1.

FIG. 7 is a diagram of a set of typical displays upon the face of the oscilloscope of FIG. 1 for the corresponding waveforms of FIG. 6.

FIG. 8 is an illustration of an avalanche driver that may be used with the recorder of FIG. 1.

Figure 18A:
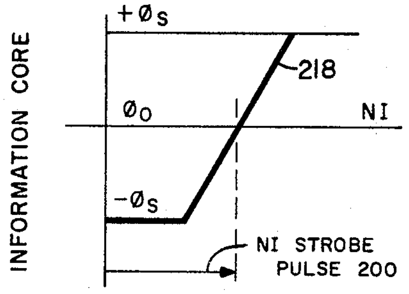

FIG. 18*a* is an illustration of the effect of the strobe pulse upon a first-polarity-wound-set information core.

Figure 18B:
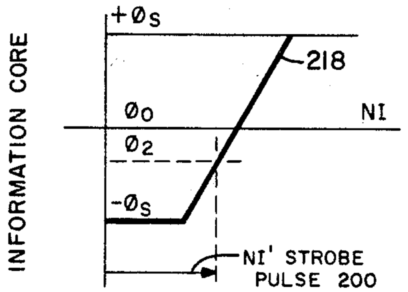

FIG. 18*b* is an illustration of the effect of the combination of the strobe and a first polarity sampled portion of the transient signal upon the first-polarity-wound-set information core.

Figure 19A:
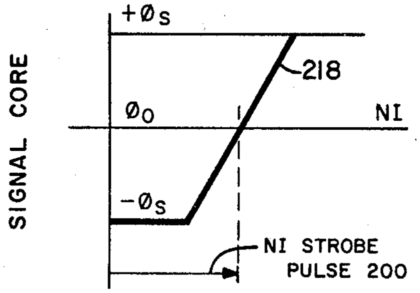

FIG. 19*a* is an illustration of the effect of the strobe pulse upon the first-polarity-wound-set signal core.

Figure 19B:
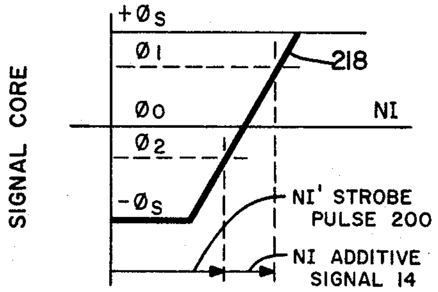

FIG. 19*b* is an illustration of the effect of the combination of the strobe pulse and a first polarity sampled portion of the transient signal upon the first-polarity-wound-set signal core.

Figure 20A:
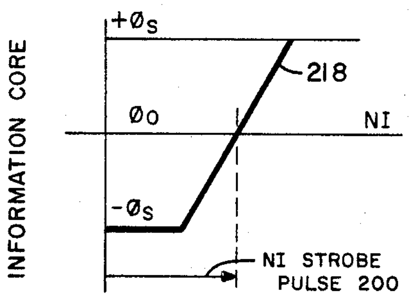

FIG. 20*a* is an illustration of the effect of the strobe pulse upon the second-polarity-wound-set information core.

Figure 20B:
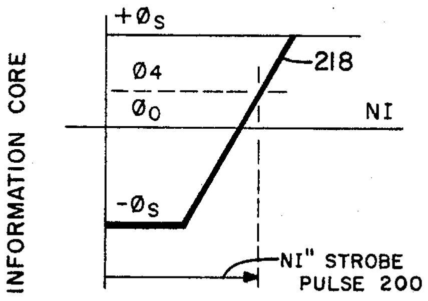

FIG. 20*b* is an illustration of the effect of the combination of the strobe pulse and a first polarity sampled portion of the transient signal upon the second-polarity-wound-set information core.

Figure 21A:
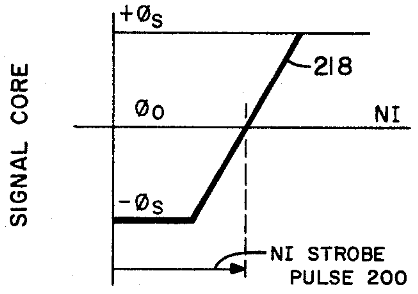

FIG. 21*a* is an illustration of the effect of the strobe pulse upon the second-polarity-wound-set signal core.

Figure 21B:
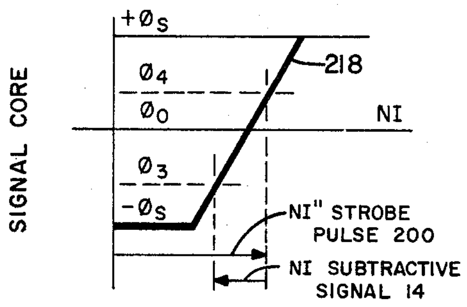

FIG. 21*b* is an illustration of the effect of the combination of the strobe pulse and a first polarity sampled portion of the transient signal upon the second-polarity-wound-set signal core.

Figure 1:
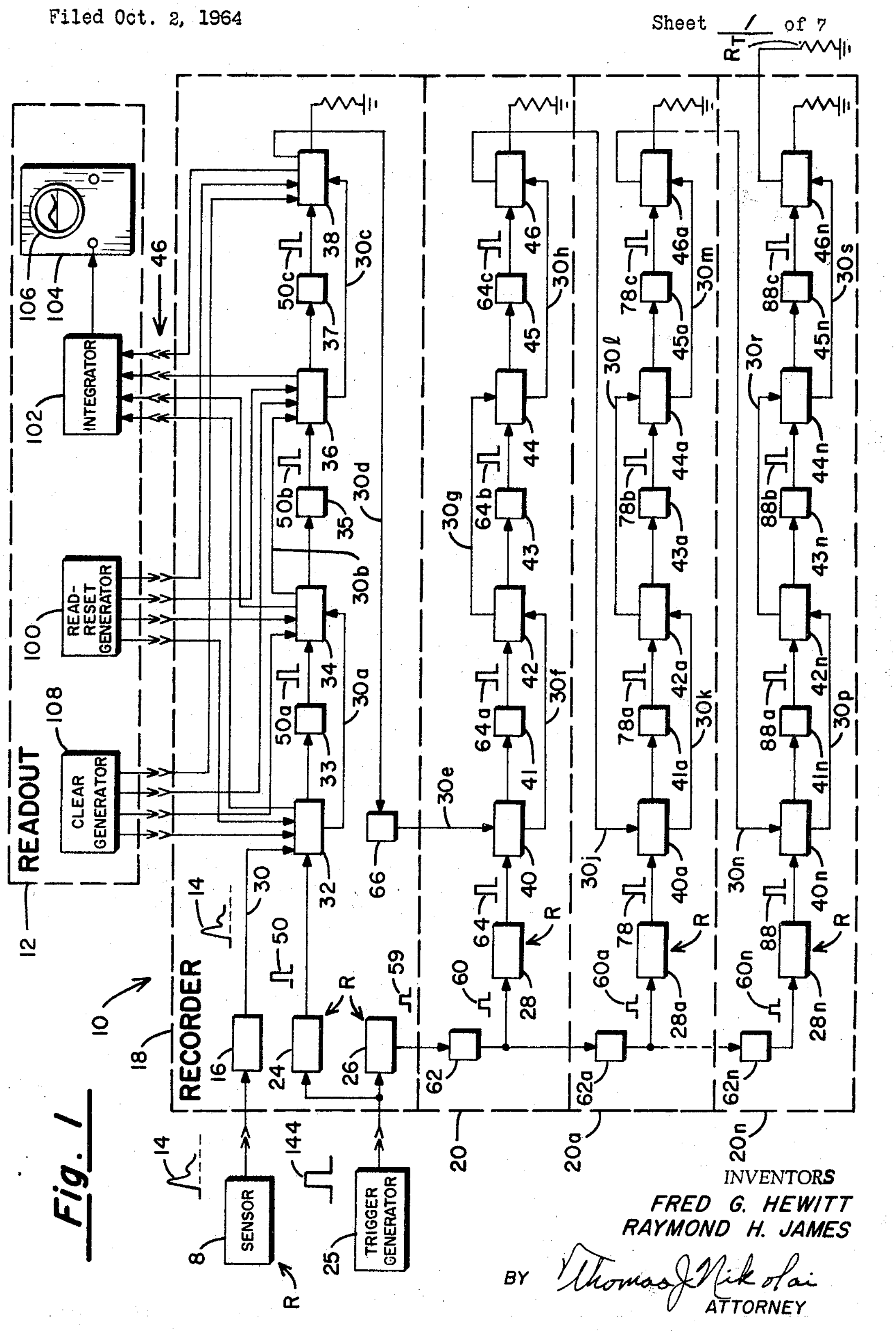
FIG. 1 is a block diagram of a preferred embodiment of a transient recorder and readout system incorporating the concepts of the present invention.

With particular referenec to FIG. 1 there is disclosed a block diagram of a preferred embodiment of a modularized low-cost, portable, real-time recorder that is completely self-contained requiring no external power supply or external control means. This preferred embodiment is substantially resistant over its operating range to an intense nuclear blast environment and as there is no shielding provided therewith, its constituent components must operate satisfactorily under such conditions. The embodiment of FIG. 1 essentially consists of three elemental parts: the separate sensor 8 that generates a constant current source type transient electrical signal that defines the sensed phenomenon; the portable recorder 10 that converts the transient electrical signal into discrete data levels, each data level indicative of the signal amplitude of a sampled portion of said transient signal, and that stores each data level in corresponding separate detectors; and, the laboratory type readout system 12 that provides the necessary input control signals and output devices that permit readout and evaluation of the data stored in the detectors of recorder 10.

In the embodiment of FIG. 1 sensor 8 couples a transient signal, for example signal 14, to clipper 16 of recorder 10 which clipper in turn serially couples its output signal to the detectors of recorder 10. Coincident with the passage of signal 14 through the detectors of recorder 10, strobe pulse generating means generates strobe pulses that are coupled to the serial strings of detector-delay sets whereby predetermined portions of signal 14 are sampled in each detector by a concurrent strobe pulse of a differing delay with respect to the wave front of signal 14. Thus, there is sampled and stored in each detector a portion of signal 14 that is representative of the amplitude of signal 14 at a particular delay time as determined by the various delay means. Subsequent readout by way of readout means 12 makes it possible to reconstruct the wave form of signal 14; readout means 12 provides data that may be plotted as signal amplitude for such time.

In the embodiment of FIG. 1 recorder 10 is illustrated as comprising a first detector-delay set 18 and a plurality of similar detector-delay sets 20, 20*a* . . . 20*n*—where detector-delay set 20*n* is the *n*th set of a plurality of similar sets. As each set 20, 20*a* . . . 20*n* is similar to each other it is apparent that such set may be a modular design whereby a plurality of *n* modularized sets 20 may be appropriately interconnected to provide a sampling of a wide range of transient signal lengths. In the discussion of the embodiment of FIG. 1 signal 14 is assumed to be a varying amplitude unipolar transient signal of a significant length of 2.5 μs. (microseconds) with a sampled portion duration that is determined by the duration of the strobe pulse of 0.05 μs.; such sample, or incremental portion of signal 14, is taken every 0.10 μs. as determined by the various delay means providing a 50% work period of the sampled pulse with respect to the transient signal.

Recorder 10 of FIG. 1 is, as stated above, specifically designed to operate in a nuclear radiation environment without any external control means. Consequently, the signal generator means of FIG. 1 are designed to initiate operation in an avalanche mode upon subjection to a nuclear radiation burst; the symbol R→ when associated with an element of FIG. 1 indicates that that element is self-initiated into operation when subjected to a nuclear radiation burst of a predetermined intensity. Thus, it is apparent that the generation of the transient signal 14 by sensor 8, generation of the strobe pulse by avalanche driver 24 and generation of the trigger pulse by avalanche driver 26 are automatically initiated by the environmental nuclear radiation burst. In contrast, complex strobe generators 28, 28*a* and 28*n* are initiated into the avalanche mode by the environmental nuclear radiation burst but are so designed as to separately generate two equal but opposite strobe pulses which cancel at their output terminals providing zero output signals; however, each of such complex strobe generators when triggered by a programmed trigger pulse—such as provided by avalanche driver 26—has only one of its separately generated strobe pulses generated and coupled to its output terminal providing a strobe pulse output signal that is in turn coupled to its associated serially aligned detector-delay set. Alternatively, when it is desired that avalanche drivers 24 and 26 be initiated into operation by an externally programmed trigger, trigger generator 25, which may be of any prior art pulse generator design, may be electrically coupled thereto and triggered at any determined time. When such strobe pulse is coincident with signal 14 at any one of its associated detectors that portion of signal 14 that is coincident with the coupled strobe pulse is stored in the magnetizable memory element as a flux level that is representative of the amplitude of the sampled portion of signal 14.

Figure 2:
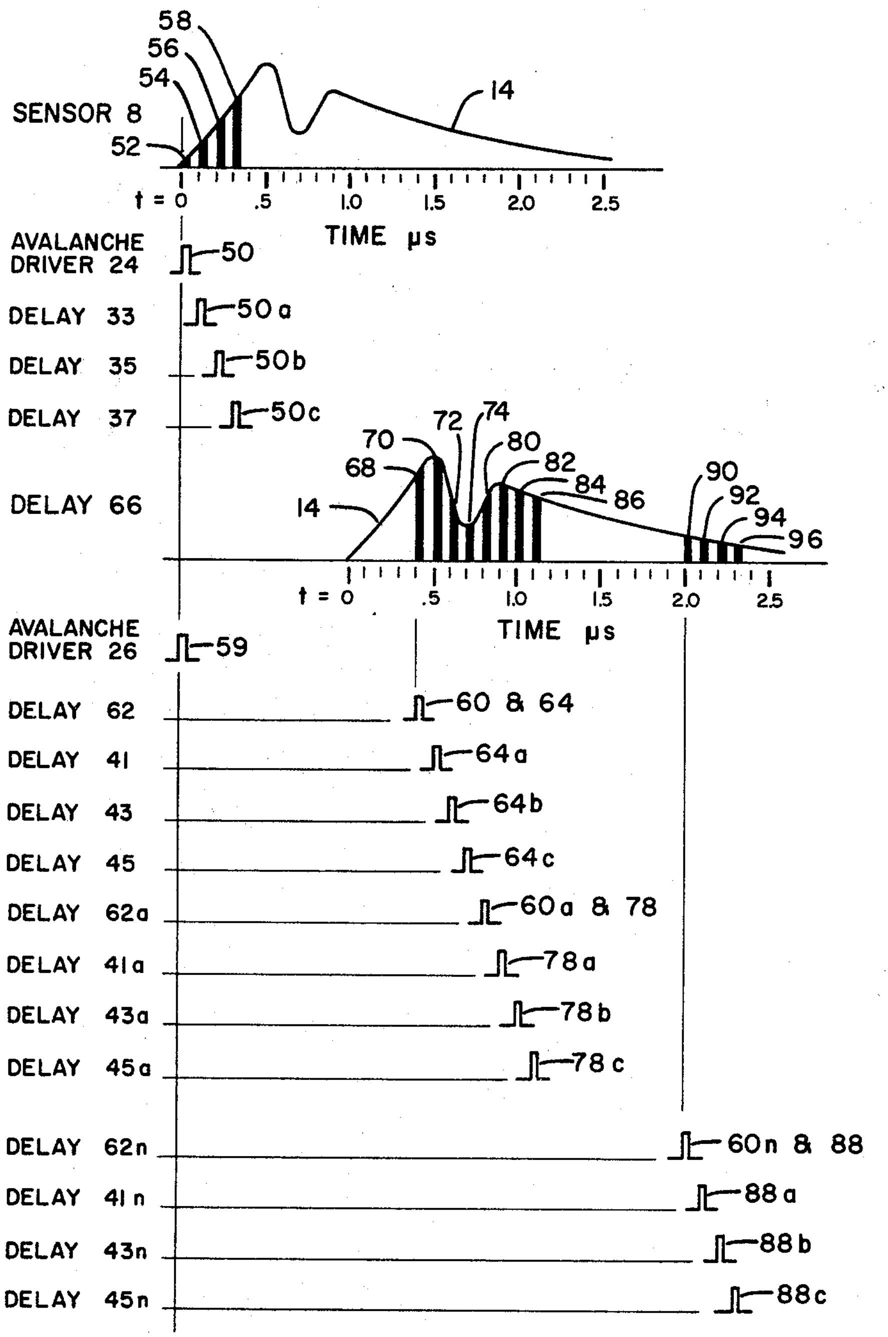
FIG. 2 is a timing chart for a typical use of the preferred embodiment of the recorder system of FIG. 1.

In the operation of the embodiment of FIG. 1 sensor 8 and recorder 10 are electrically intercoupled and placed in the environment in which the nuclear radiation pulse is to be expected. At time $t=0$—see FIG. 2—electrically interconnected sensor 8 and recorder 10 are subjected to a nuclear radiation pulse as defined by transient signal 14. Sensor 8 detects the nuclear radiation pulse and couples a transient signal, for example signal 14, to clipper 16 of recorder 10 which in turn serially couples its output signal to the detectors of recorder 10. Clipper 16 is, in this embodiment, serially arranged between sensor 8 and the detectors of recorder 10 and is included to limit the maximum, or peak, level of signal 14 to that level that can be accommodated by the subsequently serially aligned detectors. From clipper 16 signal 14 is serially intercoupled by way of conductors 30–30*t* to detectors 32, 34, 36 and 38 of detector-delay set 18; to detectors 40, 42, 44 and 46 of delay-detector set 20; to detectors 40*a*, 42*a*, 44*a* and 46*a* of delay-detector set 20*a*; and to detectors 40*n*, 42*n*, 44*n* and 46*n* of delay-detector set 20n. At time $t=0$ when avalanche driver 24 is subjected to the wave front of the nuclear radiation burst, it is initiated into operation in the avalanche mode providing at its output strobe pulse 50. Strobe pulse 50 and signal 14 are coincident at time $t=0$ at detector 30 effecting a change in the flux level of the magnetizable memory elements of detector 30 that is representative of pulse 52 of FIG. 2. Delay means 33 delays strobe pulse 50 emitted from detector 32 a delay time of 0.1 μs. coupling strobe pulse 50*a* at time $t=0.1$ μs. to detector 34 effecting a change in the flux level of the magnetizable memory elements of detector 34 that is representative of pulse 54. Delay means 35 and 37 in a like manner delay the strobe pulse that is emitted from the previous detector a delay time $t=0.1$ $\mu$s. coupling strobe pulses **50*b* and 50*c*, respectively, to the next subsequent detectors 36 and 38, respectively, effecting a change in the flux level of the magnetizable memory elements of such next subsequent detectors that are representative of pulses 56 and 58**, respectively.

Avalanche driver 26 is at time $t=0$ initiated into the avalanche mode by the nuclear radiation pulse emitting therefrom trigger pulse 59. Trigger pulse 59 is in turn electrically coupled to delay 62 which delays pulse 59 a delay time of 1.4 $\mu$s. emitting therefrom trigger pulse 60. Trigger pulse 60 initiates complex strobe generator 28—as described above complex strobe generator 28 emits a negligible signal when affected by the nuclear radiation pulse—causing it to couple strobe pulse 64 to detector 40 at time $t=1.4$ $\mu$s. Concurrently, signal 14 has passed undelayed through detectors 32, 34, 36 and 38 as described above and is coupled to delay 66 which delays signal 14 a delay time of 1.0 $\mu$s. Thus, at a time $t=1.4$ $\mu$s. when signal 14 has been delayed a delay time of 1.0 $\mu$s. there is an effective delay time difference between signal 14 and strobe pulse 64 of 0.4 $\mu$s., effecting a change in the flux level of the magnetizable memory elements of detector 40 that is representative of pulse 68 of FIG. 2. This delay of signal 14 of 1.0 $\mu$s. is provided to permit the nuclear radiation pulse initiated action of complex strobe generators 28, **28*a* and 28*n* to subside prior to recording in the detector-delay sets 20, 20*a* . . . 20*n*. Delay means 41 delays strobe pulse 64 from detector 40 a delay time of 0.1 $\mu$s. coupling strobe pulse 64*a* at time $t=1.5$ $\mu$s. to detector 42 effecting a change in the flux level of the magnetizable memory elements of detector 42 that is representative of pulse 70 of FIG. 2. Delay means 43 and 45 in a like manner delay the strobe pulse emitted from the previous detector an additional delay time of 0.1 $\mu$s. coupling strobe pulses 64*b* and 64*c*, respectively, to the next subsequent detectors 44 and 46, respectively, effecting a change in the flux level of the magnetizable memory elements of such next subsequent detectors that are representative of pulses 72 and 74**, respectively.

At time $t=1.4$ $\mu$s. trigger pulse 60 from delay 62 is also coupled to delay **62*a* which delays trigger pulse 60 a further delay time of 0.4 $\mu$s. emitting therefrom trigger pulse 60*a*. Trigger pulse 60*a* is in turn coupled to complex strobe generator 28*a* and the next subsequent delay means 62*n*. Trigger pulse 60*a* initiates complex strobe generator 28*a*—as described above complex strobe generator 28*a* emits a negligible signal when affected by the nuclear radiation pulse—causing it to couple strobe pulse 78 to detector 40*a* at time $t=1.8$ $\mu$s. Concurrently, signal 14 which has passed undelayed through detectors 40, 42, 44 and 46 of detector-delay set 20 is coupled to detector 40*a* at a time $t=1.0$ $\mu$s.; thus, at a time $t=1.8$ $\mu$s. when signal 14 has been delayed a delay time of 1.0 $\mu$s. there is an effective delay time difference between signal 14 and strobe pulse 78 of 0.8 $\mu$s. Delay means 41*a* delays strobe pulse 78 from detector 40*a* a delay time of 0.1 $\mu$s. coupling strobe pulse 78*a* at time $t=1.9$ $\mu$s. to detector 42*a* effecting a change in the flux level of the magnetizable memory elements of detector 42*a* that is representative of pulse 80 of FIG. 2. Delay means 43*a* and 45*a* in a like manner delay the strobe pulse emitted from the previous detector an additional delay time of 0.1 $\mu$s. coupling strobe pulse 78*b* and 78*c*, respectively, to the next subsequent detectors 44*a* and 46*a*, respectively, effecting a change in the flux level of the magnetizable memory elements of such next subsequent detectors that are representative of pulses 82 and 84**, respectively.

Trigger pulse **60*a* which is coupled to delay 62*n*—trigger pulse 60*a* is here presumed to have passed through previous serial arranged delays between delay 62*a* and 62*n* effecting thereby a total delay of 1.2 $\mu$s. (see FIG. 2) is delayed a further delay time of 0.4 $\mu$s. emitting trigger pulse 60*n* which is coupled to complex strobe generator 28*n*. Trigger pulse 60*n* initiates complex strobe generator 28*n*—as described above complex strobe pulse generator 28*n* emits a negligible signal when affected by the nuclear radiation pulse—causing it to couple strobe pulse 88 to detector 40*n* at a time $t=3.0$ $\mu$s. Concurrently, signal 14 which has passed undelayed through the detectors of the previous detector-delay sets is coupled to detector 40*n* at a time $t=1.0$ $\mu$s. Thus, at a time $t=3.0$ $\mu$s. when signal 14 has been delayed a delay time of 1.0 $\mu$s. there is affected a delay time difference between signal 14 and strobe pulse 88 of 2.0 $\mu$s. Consequently, there is effected a change in the flux level of the magnetizable memory elements of detector 40*n* that is representative of pulse 90 of FIG. 2. Delay means 41*n* delays strobe pulse 88 from detector 40*n* a delay time of 0.1 $\mu$s. coupling strobe pulse 88*a* at time $t=3.1$ $\mu$s. to detector 42*n* effecting a change in the flux level of the magnetizable memory elements of detector 42*n* that is representative of pulse 92. Delay means 43*n* and 45*n* in a like manner delay the strobe pulse emitted from the previous detector an additional delay time of 0.1 $\mu$s. coupling strobe pulse 88*b* and 88*c*, respectively, to the next subsequent detectors 44*n* and 46*n* effecting a change in the flux level of the magnetizable memory elements of such next subsequent detectors that are representative of pulses 94 and 96, respectively. Thus, it is apparent by inspection of FIGS. 1 and 2 that flux levels representative of the sampled portions of transient signal 14 that are representative of the sensed phenomenon have been detected and stored in the detectors of FIG. 1 which flux levels define the wave form of signal 14**.

Once the information is stored in recorder 10, readout system 12 may be utilized to readout and evaluate such information. With readout system 12 coupled to recorder 10 at connector 98 read-reset generator 100 couples the proper read signal individually and selectively to the detectors. Output signals indicative of the information stored in the detectors are, upon the separate coupling of the read signal thereto, coupled to integrator 102 which integrates the output signals from the detectors providing a representative signal which is coupled to the vertical input terminal of oscilloscope 104. The signal trace on oscilloscope face 106 is then capable of evaluation as to the signal amplitude defining the level of the information stored in the respective detector. Alternatively, the output of integrator 102 could be coupled to a signal analyzer that could provide a direct reading of the level of the information stored in the respective detector. After evaluation of the stored information, clear generator 108 couples a clear signal to the detectors clearing the information stored therein and preparing them for a subsequent recording operation. Although the control and output lines of detector-delay set 18 only are illustrated it is apparent that such lines for detectors-delay sets 20, **20*a* . . . 20*n*** are utilized but are here omitted for clarity.

With particular reference to FIG. 3 there is disclosed an illustration of a magnetic clipper 110 which may be utilized as clipper 16 of FIG. 1. In this embodiment it is the purpose of clipper 110 to clip off, or remove, that portion of the input signal 14 whose amplitude exceeds the switching threshold $NI_0$ of the storage elements of the associated detectors. Cores 112 and 114 may be typical bistable ferrite cores whose switching threshold is equal to $NI_0'$—see FIG. 16. Prior to any recording, cores 112 and 114 are set into the negative saturated remanent magnetic state by a clear pulse such as that from clear generator 108 which is of a negative saturating current pulse sense. A positive current pulse, such as signal 14, having no portion thereof greater than $NI_0'$ when coupled to input terminal 116 would pass unof a sampling procedure, of the coupled detector. Complex strobe generator 180 is comprised of avalanche drivers 140 and 160 whose output terminals 152 and 174 are common coupled to detector 182 strobe pulse input 184. As described with respect to the operation of drivers 140 and 160, such drivers are capable of initiation when subjected to an intense nuclear radiation burst R→. Accordingly, if recorder 10 is subjected to such a nuclear radiation burst both drivers conduct in the avalanche mode coupling equal but opposite polarity output pulses 142 and 162 to detector 182 at point 184 which pulses 142 and 162 cancel each other providing no effective signal thereto. Alternatively, in order that complex strobe generator 180 be designed so as to preclude the possibility of a positive going pulse being emitted therefrom delay 176 of driver 160 could have a delay time longer than that of delay 158 of driver 140; with this arrangement a small negative going pulse would be coupled to the magnetizable memory elements of detector 182 ensuring that such elements are always in the $-\phi_S$ (see FIG. 15) state prior to the sampling operation. However, if it is desired that complex strobe generator 180 initiate the sampling of a portion of signal 14 that is coupled to detector 182 at transient signal input 186, trigger generator 25, at a proper delay time with respect to signal 14, couples trigger pulse 144 to driver 140 at terminal 150. This enables driver 140 to couple strobe pulse 142 to the strobe pulse input 184 of detector 182 which samples and stores in detector 182 data that is representative of the amplitude of that portion of signal 14 that is coincident with strobe pulse 142. Thus, although the transistor circuits of drivers 140 and 160 may be inadvertently triggered by a random nuclear radiation burst R→ the sampling procedure is not initiated thereby, but is initiated only by a programmed signal. As was discussed with respect with FIG. 1 avalanche drivers 24 and 26, which may be similar to avalanche driver 140 of FIG. 8, are specifically designed to trigger upon exposure to the expected nuclear radiation burst R→; however, complex strobe generator 180 which may consist of substantially similar components is specifically designed to trigger but not emit a significant output signal therefrom. Thus, complex strobe generator 180 effectively precludes the initiation of the sampling procedure in detector-delay sets 20, **20*a* . . . 20*n*** by a random nuclear radiation burst R→.

To better understand a novel aspect of the present invention, a discussion of a constant current source driving signal as opposed to the use of a constant voltage source driving signal is presented.

Figure 11:
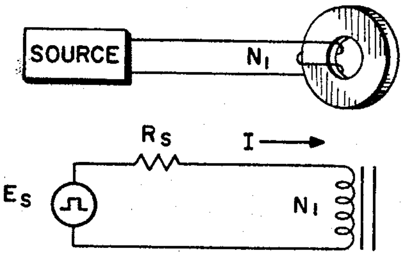
FIG. 11 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 11 illustrates the general circuit of a source driving a toroidal ferrite core with its equivalent circuit:

$E_s$=source voltage
$R_s$=source internal resistance
$N_1$=number of turns in the coil about the core
$I$=current flowing through the coil about the core This circuit may be defined mathematically by Equation 1

$$E_s=IR_s-N\frac{d\phi}{dt} \quad (1)$$

with it being assumed that the core is always initially in its negative saturated state and that the drive signal from the source drives the magnetic state of the core toward its positive saturated state. By making $R_s$ sufficiently small enough, Equation 1 reduces to Equation 2.

$$E_s\cong-N\frac{d\phi}{dt} \quad (2)$$

Therefore, by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1}d\phi=\frac{E_s}{N_1}\int_0^t dt$$

$$\phi_s-\phi_1=\frac{E_s t}{N_1} \quad (3)$$

For a complete flux reversal the integral, taken from $-\phi_S$ to $+\phi_S$, is (with $T_s$=time required for a complete flux reversal from $-\phi_S$ to $+\phi_S$)

$$\int_{-\phi_s}^{+\phi_s}d\phi=\frac{E_s}{N_1}\int_0^{T_s} dt$$

$$2\phi_s=\frac{E_s T_s}{N_1} \quad (4)$$

The voltage E induced in any coil about the core is (with $N_2$=the number of turns of a second coil on the core)

$$E=\frac{E_s N_2}{N_1}=\frac{2\phi_s}{T_s}N_2$$

Figure 13:
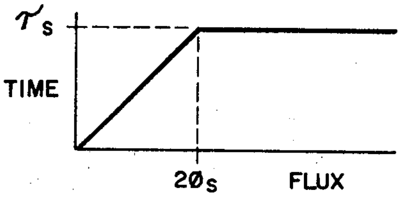
FIG. 13 is an illustration of the plot of flux versus time of the core of FIG. 11.
Figure 12:
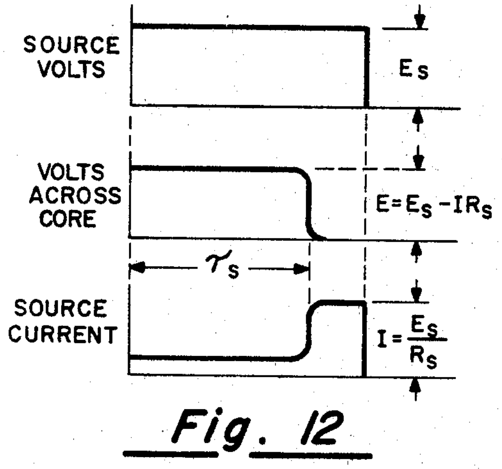
FIG. 12 is an illustration of the resulting voltages and currents of the circuit of FIG. 11 when driven by a constant voltage source.

The resulting voltages and currents under constant voltage source conditions are illustrated in FIG. 12, Equations 3 and 4 show that a plot of flux $\phi$ versus time would be as illustrated in FIG. 13. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot flux $\phi$ versus time over the range of $0<\phi<2\phi_s$ as illustrated in FIG. 13 is due to the characteristics of the constant voltage source rather than those of the core.

If $R_s$ is made sufficiently large, Equation 1 reduces to Equation 5.

$$E_s\cong IR_s \quad (5)$$

Figure 14:
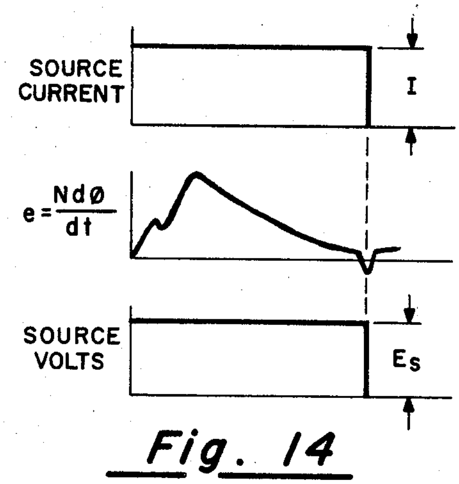
FIG. 14 is an illustration of the resulting voltages and currents of the circuit of FIG. 11 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 14. It is under these constant current source conditions that this present invention is concerned.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s=\frac{S_w}{H-H_o}=\frac{S_{w'}}{NI-NI_o}$$

where $r$=radius of toroidal core
$\tau_s$=switching time
I=current in amperes
$S_w$=material constant
N=number of turns
H=applied field in oe. (oersteds)$=NI/5r$
$H_o$=switching threshold in oe.$=NI_o/5r$
$S_{w'}=S_w5r$ Since the applied field H is inversely proportional to the radius of the core, flux reversal takes place faster in an inside ring of the core than in an outside ring of the core. Applying a time-limited drive field to the core results in a flux reversal distribution which decreases with increase in radial distance. That portion of the core which is in a partial switched state exhibits magnetic properties which affected—except for a possible increase in rise time—through clipper 110 and would be emitted at terminal 118. However, any portion of signal 14 greater than $NI_0'$ would cause the magnetic flux of cores 112 and 114 to be switched toward the positive saturated remanent magnetic state. Concurrent with this flux reversal, a back EMF will be induced in the turns about the cores which EMF is in opposition to the incoming signal 14. The resultant output at terminal 118 will effectively consist of signal 14a which ideally is that portion of the incoming signal 14 whose amplitude does not exceed the MMF of $NI_0'$. The clipping level $NI_0'$ for a given core is dependent upon the number of turns about the core; the amount of clipping of the incoming signal 14 is determined by $N\phi$, where $\phi$ is the volt-time integral of the core per turn and N is the number of turns about the core.

With particular reference to FIG. 4, there is disclosed an illustration of a lumped constant delay line that may be utilized as the delays of FIG. 1. In this embodiment delay line 120 having input terminal 122 and output terminal 124, is made up of a cascaded series of LC sections the parameters of which are adjusted to delay the input signal, such as signal 14a, at input terminal 122 the desired delay time D when emitted at output terminal 124. Although a lumped constant delay line is illustrated any appropriate form of delay line may be utilized. See the text "Pulse and Digital Circuits," McGraw-Hill, pp. 286–321 for an excellent discussion of delay line theory.

With particular reference to FIG. 5 there is disclosed an illustration of an integrator 130 that may be utilized as integrator 102 of FIG. 1. In this embodiment it is the purpose of integrator 130 to integrate the output signals of the detectors that are coupled to input terminal 132 and to provide at output terminal 134 a signal whose waveform can provide a reliable means of calibrating such detector output signals to provide a satisfactory correlation of the level of the data stored in the respective detector with a measured output signal amplitude. In one method of achieving such correlation, detector output signals 136a, 136b, 136c and 136d of FIG. 6, each representative of a different level of data stored in the detectors of FIG. 1 when integrated by integrator 130 produced the integrator output signals 138a, 138b, 138c, and 138d; respectively, of FIG. 7. Upon the observation and calibration of signals 138a, 138b, 138c, and 138d as displayed upon oscilloscope face 106 it was determined that the amplitudes of such signals after a certain delay time, for example at a time 15 $\mu$s. after their wave fronts, were in direct correlation with the levels of the data stored in the respective detectors.

With particular reference to FIG. 8, there is disclosed an illustration of an avalanche driver 140 that may be utilized as drivers 24 and 26 of FIG. 1. It is the purpose of driver 140 to generate positive polarity strobe pulse 142 upon activation by a programmed trigger signal 144 or a nuclear radiation burst R→. As recorder 10 is primarily for the purpose of recording sampled portions of a transient signal while in an environment of intense nuclear radiation, recorder 10 may be considered to be a one-shot recording device. That is, recorder 10 is to be exposed to a single transient signal in an environment of intense nuclear radiation, to record sampled portions of such signal and then to have the stored data read out in laboratory type facilities by readout system 12 prior to exposure to a subsequent transient signal. As the radiation environment may have a permanent degrading effect upon the operating characteristics of avalanche transistor 146 and battery 148, such components are considered to be expendable items and may, if necessary, be replaceable parts to be replaced after each exposure to the radiation environment.

With no signal coupled to terminal 150 of driver 140, transistor 146 is reverse biased into the normal nonconducting mode by the biasing arrangement of resistors 152, 154, and 156 and the positive voltage source of battery 148 providing a zero voltage signal at output terminal 152. The capacitors of open ended delay line 120 (see FIG. 4) are then charged to a potential of approximately 130 volts by battery 148 through resistor 156. When trigger signal 144 is coupled to terminal 150 the collector-base electrode junction of transistor 146 is reverse biased beyond its avalanche breakdown potential and the collector-emitter electrode junction breaks down causing it to appear as a short circuit to the charge stored in the capacitors of delay line 120; resistor 156 is of a large value, such as 100,000 ohms, such that battery 148 is effectively isolated from transistor 146 during this breakdown period. Additionally, the circuit of FIG. 8 is itself capable of avalanche breakdown upon exposure to a nuclear radiation burst R→ of the proper characteristic. Such a radiation burst may be utilized in place of the programmed trigger 144 of trigger generator 25 of FIG. 1. Delay 120 then discharges through the collector-emitter electrode junction of transistor 146 to ground through resistor 154 causing a high amplitude positive polarity strobe signal 142 to appear at terminal 152. The delay line 120 continues to discharge through resistor 154 over a period twice the delay of delay line 120. Consequently, with a desired strobe pulse duration of, for example, 0.05 $\mu$s., the delay of delay line 120 is 0.025 $\mu$s. After this time delay line 120 is ineffective to hold the collector-emitter electrode junction of transistor 146 in its avalanche mode and transistor 146 reverts to its nonconducting mode causing a zero potential signal to appear at terminal 152.

Figure 9:
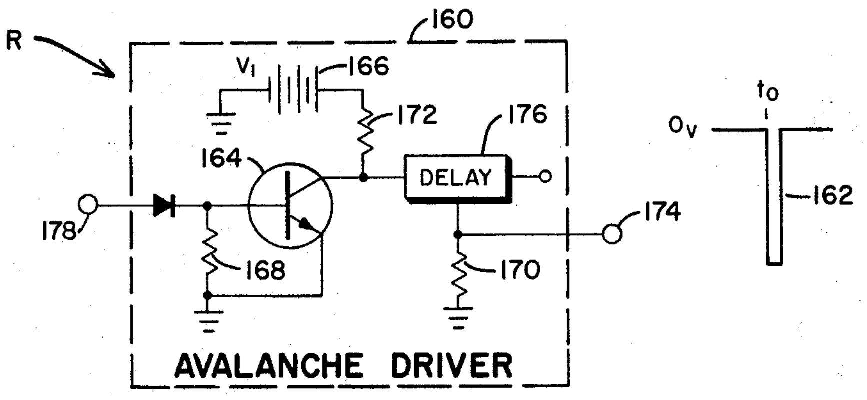
FIG. 9 is an illustration of an avalanche driver that may be combined with the avalanche driver of FIG. 8 to form the complex strobe generator of FIG. 10.
Figure 10:
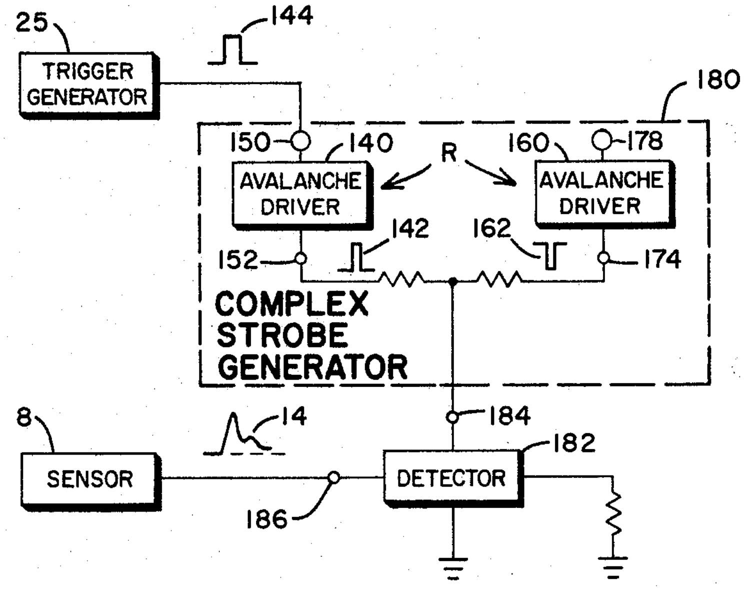
FIG. 10 is an illustration of the complex strobe generator of FIG. 1.

With particular reference to FIG. 9, there is disclosed an illustration of an avalanche driver 160 that may be combined with the avalanche driver 140 of FIG. 8 to form the complex strobe generator of FIG. 10. It is the purpose of driver 160 to generate negative polarity strobe pulse 162 upon activation by a nuclear radiation burst R→. As the radiation environment may have a permanent degrading effect upon the operating characteristics of avalanche transistor 164 and battery 166, such components are considered to be expendable items and may, if necessary, be replaceable parts to be replaced after each exposure to the radiation environment.

With no signal coupled to terminal 178 and with driver 160 not subjected to a nuclear radiation burst R→ of a sufficient intensity to initiation conduction of transistor 164, transistor 164 is reverse biased into the normal nonconducting mode by the biasing arrangement of resistors 168, 170, and 172 and the positive voltage source of battery 166 providing a zero voltage signal at output terminal 174. The capacitors of open ended delay line 176 (see FIG. 4) are then charged to a potential of approximately 130 volts by battery 166 through resistor 172. When transistor 164 is initiated into conduction by the nuclear radiation burst R→ the collector-base electrode junction of transistor 164 is reverse biased beyond its avalanche breakdown potential and the collector-emitter electrode junction breaks down causing it to appear as a short circuit to the charge stored in the capacitors of delay line 176—resistor 172 is of a large value, such as 100,000 ohms, such that battery 166 is effectively isolated from transistor 164 during this breakdown period. Delay line 176 then discharges through the collector-emitter electrode junction of transistor 164 to ground through resistor 170 causing a high amplitude negative polarity signal 162 to appear at terminal 174. The delay line 176 continues to discharge through resistor 170 over a period twice the delay of delay line 176. Consequently, with a desired strobe pulse duration of, for example, 0.05 $\mu$s., the delay of delay line 104 is 0.025 $\mu$s. After this time delay line 176 is ineffective to hold the collector-emitter electrode junction of transistor 164 in its avalanche mode and transistor 164 reverts to its nonconducting mode again causing a zero potential signal to appear at terminal 174.

With particular reference to FIG. 10 there is illustrated the complex strobe generator 180 that is immune to nonprogrammed triggering, i.e., uncontrolled initiation are similar to a demagnetized state except for some asymmetry. The amount of asymmetry and the shape of the curve for a time-limited state are functions of both the drive field amplitude and duration.

Figure 15:
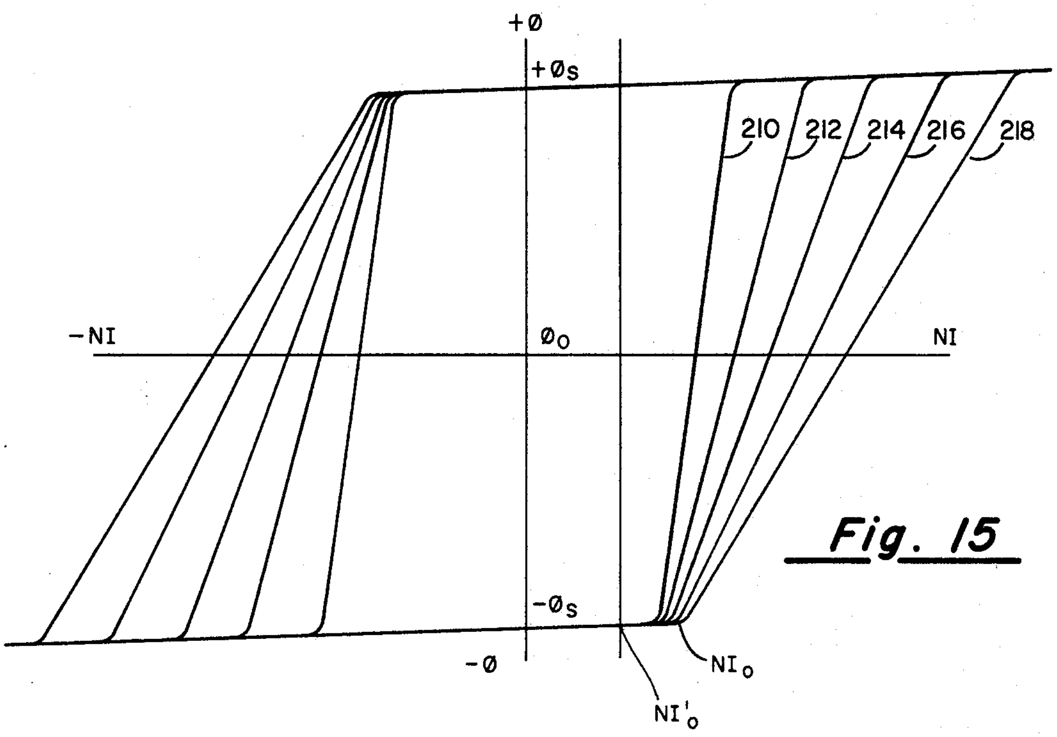
FIG. 15 is an illustration of the residual magnetization curves of the core of FIG. 11 utilizing the time-limited different-amplitude flux sampling strobe pulses of the present invention.

With particular reference to FIG. 15 there is illustrated a residual magnetization curve 210 of the magnetic devices utilized by the present invention. Curve 210 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 212–218 are residual magnetization curves and are plots of irreversible flux $\varphi$ versus the applied magnetomotive force NI wherein the drive current signal for each curve is of a constant but different duration, and of increasing amplitude, i.e., curve 218 is for that of a pulse of the shortest duration and curve 212 is for that of a pulse of the longest duration. Each curve is obtained by using a drive current signal of a constant duration less than $\tau_s$ and successively increasing the signal amplitude for each successive application of the drive current signal. The net irreversible flux $\varphi$ for each applied drive current signal is then plotted versus the applied magnetomotive force NI to provide the curve 212–218 for each particular drive current signal duration.

In the particular application of applicants' illustrated embodiment there is utilized a strobe pulse 200 (see FIG. 16) which is of a sufficient amplitude but of insufficient duration to switch the magnetic state of the coupled core from $-\phi_s$ to $+\phi_s$. This strobe pulse 200 is obtained from a constant current source and is limited in duration, e.g., time-limited, so as to set the magnetic state of the core in the flux state $\varphi_o$ of curve 218. Any variation in the amplitude of strobe pulse 200 causes the magnetic state of the coupled core to be set into a different flux state between the limits of $+\phi_s$ and $-\phi_s$.

Figure 16:
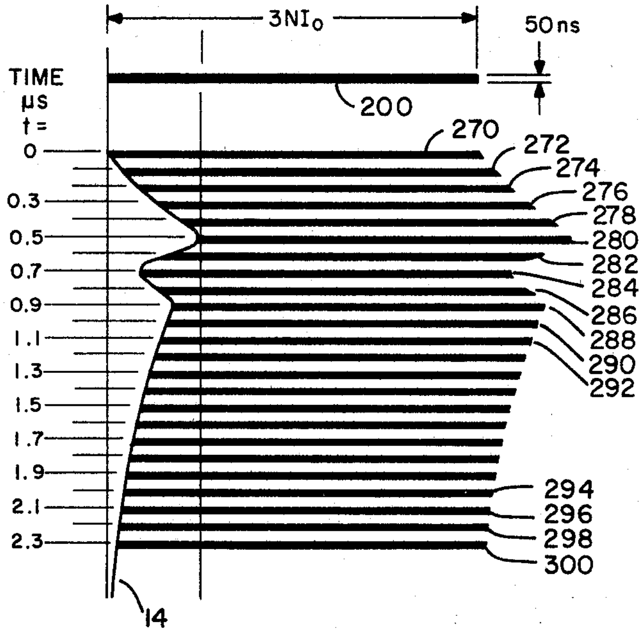
FIG. 16 is an illustration of a plot of a series of varying delayed strobe pulses upon a transient signal.

The present invention is concerned with a system utilizing a detector for and a method of sampling a transient current signal using the partial switching of a magnetic element. With particular reference to FIG. 16, there is illustrated a typical transient signal 14 which is to be sampled at any one or a plurality of times. Signal 14 is assumed to originate in a constant current source and is, in this embodiment, a unidirectional signal whose maximum NI as regards the coupled device is less than $NI_o$, the switching threshold of the magnetic element. Of course, no such limitation as to the unidirectional character of the transient current signal is intended herein for a bidirectional signal could be utilized as disclosed in the aforementioned copending patent application of L. L. Harklau et al.

Figure 17:
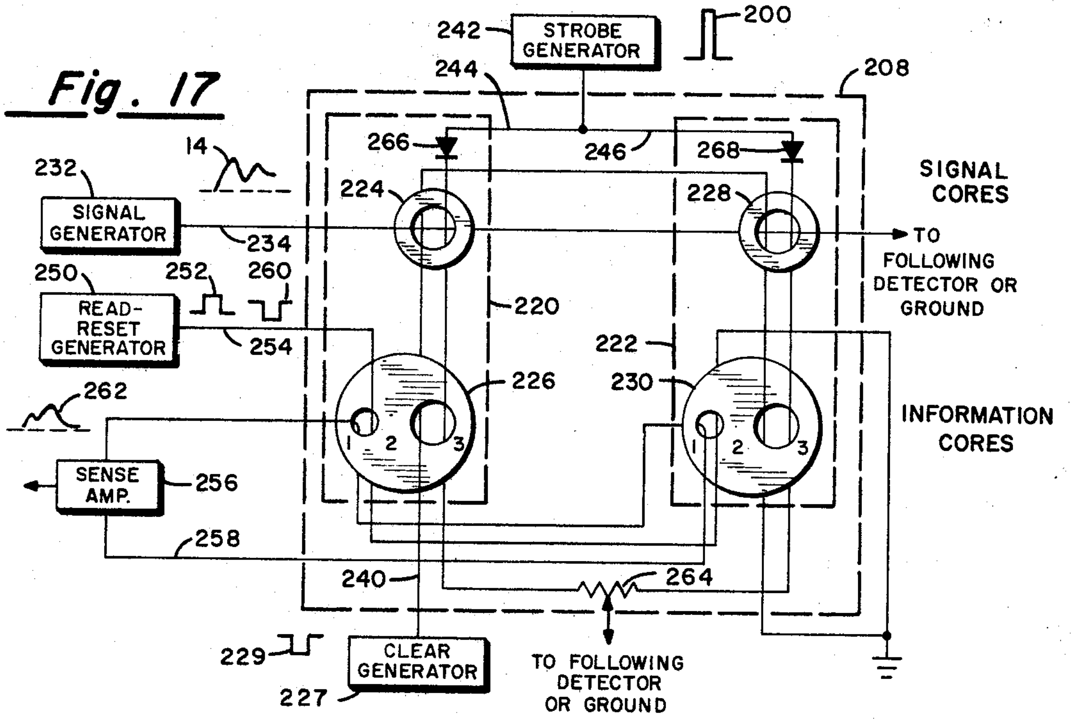
FIG. 17 is an illustration of the detector utilized in the present invention.

With particular reference to FIG. 17 there is disclosed the detector 208 of the present invention. Detector 208 is comprised of two toroidal core-transfluxor core sets; the operation of each set of which is fully disclosed in the aforementioned copending patent application of L. L. Harklau et al. As more fully discussed in such copending patent application, each set includes a signal core and an information core, such as toroidal ferrite signal core 224 and transfluxor information core 226 of set 220, each core having the magnetic characteristic of FIG. 15.

The parallel arrangement of sets 220 and 222 permits the serial coupling of a plurality of detectors 208. The operation of each set, such as sets 220 and 222, in a serially arranged plurality of sets requires that the strobe pulse drive line impedance be independent of the signal level of the sampled portion of the transient signal that is sampled in each set of the sets that are serially coupled by the common strobe pulse drive line. This is so as storage of the information in the information core in each set is a function of the change in the strobe pulse drive line impedance due to the back EMF induced in the strobe pulse drive line due to the transient signal sampled portion that is coupled to the signal core of the same set. By coupling the two sets of each detector in parallel and operating each set of the detector in an opposing magnetic sense a change in strobe pulse drive line impedance in each set is of an equal but opposite effect making the net external effect of the detector upon the impedance of the strobe pulse drive line as it passes through the detector equal to zero. Thus, the parallel arranged sets 220 and 222 of detector 208 effectively isolate the internal strobe pulse drive line impedance variations from each other serially arranged detector 208. Additionally, by coupling the small aperture in each transfluxor in an opposing magnetic sense by the sense line the total flux change detected by the sense line upon readout is the difference-signal between the flux states in the flux paths defined by the small apertures of the signal cores of each set thus providing an output signal that has a direct correlation with the amplitude and polarity of the transient signal sampled portion. Further, the use of a transfluxor as the information core permits the nondestructive readout of the information stored therein. Operation of the detector of FIG. 17 is best explained by the use of FIGS. 18a, 18b; 19a, 19b; 20a, 20b; 21a, 12b. For an exemplary explanation of the operation of the illustrated embodiment of FIG. 17, unidirectional transient signal 14 is of a maximum amplitude less than $NI_o$—see FIG. 16—and is coupled at time $t=0$ to signal cores 224 and 228 by constant current type signal generator 232 by way of drive line 234. Strobe pulse 200 is, as discussed above, of a time-limited amplitude-duration characteristic such as to drive the magnetic states of signal cores 224 and 228 from an initial saturated state $-\phi_s$—see FIGS. 19 and 21—into a time-limited 50% flux state $\varphi_o$. Additionally, strobe pulse 200 is of a duration $D=0.05$ µs. which is also chosen as the delay increment D which is the incremental delay time of delays **33, 35, 37, 41, 43, 45, 41*a*, 43*a*, 45*a*, 41*n*, 43*n* and 45*n* of FIG. 1 and which is also the incremental delay of strobe pulse 200 with respect to transient signal 14. As illustrated in FIG. 16 pulses 170, 172, 174, 176 . . . 178 are the combined drive signals due to strobe pulse 200 and transient signal 14 for the delays of strobe pulse 200** delayed times 0, 2D, 4D, 6D, . . . 48D, respectively.

Preparatory to the write-inoperation constant current type clear generator 226 couples clear pulse 228, which is of a saturating amplitude-duration characteristic, to drive line 240 setting the magnetic states of cores 224, 226, 228 and 230 in an initial clear state $-\phi_s$—see FIGS. 18a, 19a, 20a, and 21a. Next, if the write-in operation is initiated without a transient signal 14 being coincident in time with the strobe pulse 200, constant current type strobe pulse generator 242 couples strobe pulse 200 to cores 222 and 226 of set 220 by way of drive line 244 and to cores 228 and 230 of set 222 by way of drive line 246. As stated before, strobe pulse 200 is of such a time-limited amplitude-duration characteristic such as to drive the magnetic states of cores 224, 226, 228 and 230 from their initial saturated state $-\phi_s$ to a time-limited 50% flux state $\varphi_o$—see FIGS. 18a, 19a, 20a, and 21a. Note: as the operation of a transfluxor, such as cores 226 and 230, operates on a transfer of the flux about the small aperture and as information is stored in the transfluxor by the affecting of a change in the magnetic state of the flux in leg 2 (see FIG. 17) between the large and small apertures, it is preferred that path 2–3 of cores 226 and 230 be of substantially the same total flux capacity and reluctance as that of cores 224 and 226. Accordingly, when strobe pulse 200 is coupled to cores 226 and 230 the flux paths defined by paths 2–3 around the large apertures of cores 226 and 230 are placed in the same time-limited 50% flux state $\varphi_o$ as are the flux paths of cores 224 and 228. In this respect the operation of the flux about the large apertures as limited by the dimensions of leg 2 of cores 226 and 230 function substantially the same as that of cores 224 and 228. It is to be understood that such limitation—the limitation that the flux paths defined by paths 2–3 around the large apertures of cores 226 and 230 are to be substantially similar to the flux paths defined by cores 224 and 228—is not necessary to the operation of the present invention, but is merely utilized to expedite the explanation of the operation of the embodiment of FIG. 17.

For the readout operation, constant current type read-reset signal generator 250 couples saturating amplitude-duration characteristic—with respect to flux path 1–2 around the small apertures of cores 226 and 230—read pulse 252 to the small apertures of cores 226 and 230 by way of drive line 254. As sense amplifier 256 is coupled to the small apertures of cores 226 and 230 in the opposite magnetic sense by sense line 258, the flux changes about the small apertures of 226 and 230 (due to the action of the read pulse 252 coupled thereto and to the flux states about paths 2–3 of the large apertures of cores 226 and 230 being of an equal and similar magnetic sense) cause the difference-signal induced in sense line 258 to be substantially zero. Accordingly, with no transient signal 14 having been sampled by the concurrent action of a strobe pulse 200, sense amplifier 256 will produce an output signal of zero amplitude indicative of no signal having been stored therein.

Next, assume that the transient signal 14 is to be sampled at a time subsequent to its initiation at time $t=0$, such as at a time $t=0.3$ $\mu$s. or at a delay of D=6 with respect to the initiation of the transient signal 14. As before, the preparatory or set-up operation is initiated when constant current type clear generator 236 couples clear-pulse 238 to cores 224, 226, 228 and 230 by way of drive line 240 setting the magnetic states of cores 224, 226, 228 and 230 in an initial clear state $-\phi_S$. Next, at a time $t=0$, signal generator 232 couples transient signal 14 to signal cores 224 and 228 by way of drive line 234. At a time $t=0.3$ $\mu$s. after the initiation of the transient signal 14 strobe pulse generator 242 couples strobe pulse 200 to cores 224 and 226 of set 220 by way of line 242 and to cores 228 and 230 of set 242 by way of drive line 246. At such time, i.e., when strobe pulse 200 is delayed a period D=6 with respect to transient signal 14, the coincident-in-time accumulative effect of transient signal 14 to strobe pulse 200 produces pulse 276—see FIG. 16—which is coupled to signal cores 224 and 228. As before, only strobe pulse 200 is coupled to information cores 226 and 230. However, as discussed before with respect to the generation of the back EMF due to a drive signal coupling a core causing the core to undergo a flux change therein, there is generated in drive lines 244 and 246 a back EMF due to the sampled portion of transient signal 14 which is that portion of transient signal 14 that is coincident-in-time with the delayed strobe pulse 200. This back EMF has the affect of changing the effectiveness of strobe pulse 200 causing the magnetic states of cores 224, 226, 228 and 230 to assume the flux states of $\phi_1$, $\phi_2$, $\phi_3$, $\phi_4$, respectively, as illustrated in FIGS. 19*b*, 18*b*, 21*b*, and 20*b*, respectively.

For the readout operation constant current type read-reset signal generator 250 couples read pulse 252 to the small apertures of cores 226 and 230 by way of drive line 254. Read pulse 252 causes the magnetic state of the flux of path 1–2 of core 226 to move from the flux state $\phi_2$ to its original set flux state $-\phi_S$—while the flux of path 1–2 of core 230 is caused to move from its set flux state $\phi_4$ back to its original set state $-\phi_S$. As described above, due to the winding sense of sense line 258 with the small apertures of cores 226 and 230, there is produced a net flux change effect in sense line 258 of $\phi_4$–$\phi_2$ inducing an output signal 262 in sense line 258 which is coupled to sense amplifier 256. After readout, read-reset signal generator 250 couples reset pulse 260 to drive line 254 resetting the magnetic state of paths 1–2 of cores 226 and 230 back into their set states $\phi_2$ and $\phi_4$ respectively.

In certain instances wherein more accurate equalization of the impedances of drive lines 244 and 246 is desired a resistor 264, of say 10 ohms, may be utilized. Additionally, diodes 266 and 268 may be inserted in strobe pulse drive lines 244 and 246, respectively, if excessive circulating currents appear therein.

Referring back to FIGS. 1 and 2 and utilizing: a delay D=2 of 0.10 $\mu$s. for delays 33, 35, 37, 41, 43, 45, **41*a*, 43*a*, 45*a*, 41*n*, 43*n* and 45*n*; a delay D=8 of 0.4 $\mu$s. for delays 62*a* and 62*n*; a delay D=20 of 1.0 $\mu$s. for delay 66; and, a delay D=28 of 1.4 $\mu$s. for delay 62**, the following time-limited drive fields of the respective pulses of FIG. 16 are coupled to the magnetizable memory elements of the corresponding detectors of FIG. 1.

| Detector: | Pulse |
|---|---|
| **32** | **270** |
| **34** | **272** |
| **36** | **274** |
| **38** | **276** |
| **40** | **278** |
| **42** | **280** |
| **44** | **282** |
| **46** | **284** |
| **40*a*** | **286** |
| **42*a*** | **288** |
| **44*a*** | **290** |
| **46*a*** | **292** |
| **40*n*** | **294** |
| **42*n*** | **296** |
| **44*n*** | **298** |
| **46*n*** | **300** |

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A portable radiation-hardened recording system, comprising:

first, second, through $n$ detector-delay sets, each of said sets including;
- a plurality of magnetizable detector means;
- a plurality of interleaved strobe pulse delay means, a separate one intermediate adjacent ones of said plurality of detector means;
- a transient signal drive line serially intercoupling said plurality of detector means;
- a strobe pulse drive line serially intercoupling said interleaved detector means and delay means;

the transient signal drive lines of said $n$ sets serially intercoupled;

a transient signal delay means intercoupled intermediate the transient signal drive lines of said first and second sets;

sensor means for coupling a relatively long duration varying amplitude transient electrical signal to said serially intercoupled transient signal drive lines;

first strobe generator means for coupling a relatively short duration time-limited strobe pulse to the strobe pulse drive line of said first set;

separate complex strobe generator means coupled to separate ones of the strobe pulse drive lines of said second through $n$th sets for coupling a relatively short duration time-limited strobe pulse to the strobe pulse drive lines of said second through $n$th sets;

a plurality of serially intercoupled trigger pulse delay means, a separate one associated with a separate one of said second through $n$th sets;

second strobe generator means for coupling a trigger pulse to said plurality of serially intercoupled trigger pulse delay means;

the respectively delayed trigger pulse emitted from the respective trigger pulse delay means coupled to the trigger pulse delay means associated complex strobe generator;

said trigger generator means coupling said trigger pulse to said plurality of trigger pulse delay means for causing respectively delayed trigger pulses to be coupled to the trigger pulse delay means associated complex strobe generator means whereby said complex strobe generator means couple respectively delayed relatively short duration time-limited strobe pulses to their associated strobe pulse drive lines coincident with said sensor means coupling said transient signal to said serially intercoupled transient signal drive lines;

said strobe pulses coincident at their respectively associated detector means with a different relatively short duration sampled portion of said transient signal;

each of said detector means recording its respective transient signal sampled portion as a respective time-limited flux level.

2. A portable radiation-hardened recording system, comprising:

first, second, through $n$ detector-delay sets, each of sets including;

a plurality of magnetizable detector means;

a plurality of interleaved strobe pulse delay means, a separate one intermediate adjacent ones of said plurality of detector means;

a transient signal drive line serially intercoupling said plurality of detector means;

a stroke pulse drive line serially intercoupling said interleaved detector means and delay means;

the transient signal drive lines of said $n$ sets serially intercoupled;

a transient signal delay means intercoupled intermediate the transient signal drive lines of said first and second sets;

sensor means for coupling a relatively long duration varying amplitude transient electrical signal to said serially intercoupled transient signal drive lines;

clipper means coupled intermediate said sensor means and said serially intercoupled transient signal drive lines for limiting the peak level of said transient electrical signal to that level that can be accommodated by the subsequently serially aligned detector means;

first strobe generator means for coupling a relatively short duration time-limited strobe pulse to the strobe pulse drive line of said first set;

separate complex strobe generator means coupled to separate ones of the strobe pulse drive lines of said second through $n$th sets for coupling a relatively short duration time-limited strobe pulse to the strobe pulse drive lines of said second through $n$th sets;

a plurality of serially intercoupled trigger pulse delay means, a separate one associated with a separate one of said second through $n$th sets;

second strobe generator means for coupling a trigger pulse to said plurality of serially intercoupled trigger pulse delay means;

the respectively delayed trigger pulse emitted from the respective trigger pulse delay means coupled to the trigger pulse delay means associated complex strobe generator;

said second strobe generator means coupling said trigger pulse to said plurality of trigger pulse delay means for causing respectively delayed trigger pulses to be coupled to the trigger pulse delay means associated complex strobe generator means whereby said complex strobe generator means couple respectively delayed relatively short duration time-limited strobe pulses to their associated strobe pulse drive lines coincident with said sensor means coupling said transient signal to said serially intercoupled transient signal drive lines;

said strobe pulses coincident at their respectively associated detected means with a different relatively short duration sampled portion of said transient signal;

each of said detector means recording its respective transient signal sampled portion as a respective time-limited flux level.

3. A portable radiation-hardened recording system, comprising:

first, second, through $n$ detector-delay sets, each of sets including;

a plurality of magnetizable detector means;

a plurality of interleaved strobe pulse delay means, a separate one intermediate adjacent ones of said plurality of detector means;

a transient signal drive line serially intercoupling said plurality of detector means;

a strobe pulse drive line serially intercoupling said interleaved detector means and delay means;

the transient signal drive lines of said $n$ sets serially intercoupled;

a transient signal delay means intercoupled intermediate the transient signal drive lines of said first and second sets;

constant current type sensor means for coupling a relatively long duration varying amplitude transient electrical signal to said serially intercoupled transient signal drive lines;

first driver means for coupling a relatively short duration time-limited strobe pulse to the strobe pulse drive-line of said first set;

separate complex strobe generator means coupled to separate ones of the strobe pulse drive lines of said second through $n$th sets for coupling a relatively short duration time-limited strobe pulse to the strobe pulse drive lines of said second through $n$th sets;

a plurality of serially intercoupled trigger pulse delay means, a separate one associated with a separate one of said second through $n$th sets;

second driver means for coupling a trigger pulse to said plurality of serially intercoupled trigger pulse delay means;

the respectively delayed trigger pulse emitted from the respective trigger pulse delay means coupled to the trigger pulse delay means associated complex strobe generator;

said second driver means coupling said trigger pulse to said plurality of trigger pulse delay means for causing respectively delayed trigger pulses to be coupled to the trigger pulse delay means associated complex strobe generator means whereby said complex strobe generator means couple respectively delayed relatively short duration time-limited strobe pulses to their associated strobe pulse drive lines coincident with said sensor means coupling said transient signal to said serially intercoupled transient signal drive lines;

said strobe pulses coincident at their respectively associated detector means with a different relatively short duration sampled portion of said transient signal;

each of said detector means recording its respective transient signal sampled portion as a respective time-limited flux level.

4. A portable radiation-hardened recording system, comprising:

first, second, through $n$ detector-delay sets, each of sets including;

a plurality of magnetizable detector means;

a plurality of interleaved strobe pulse delay means, a separate one intermediate adjacent ones of said plurality of detector means;

a transient signal drive line serially intercoupling said plurality of detector means;

a strobe pulse drive line serially intercoupling said interleaved detector means and delay means;

the transient signal drive lines of said $n$ sets serially intercoupled;

a transient signal delay means intercoupled intermediate the transient signal drive lines of said first and second sets;

constant current type sensor means for coupling a relatively long duration varying amplitude transient electrical signal to said serially intercoupled transient signal drive lines;

first constant current type avalanche driver means for coupling a relatively short duration time-limited strobe pulse to the strobe pulse drive line of said first set;

separate complex strobe generator means coupled to separate ones of the strobe pulse drive lines of said second through *n*th sets for coupling a relatively short duration time-limited strobe pulse to the strobe pulse drive lines of said second through *n*th sets;

a plurality of serially intercoupled trigger pulse delay means, a separate one associated with a separate one of said second through *n*th sets;

second constant current type avalanche driver means for coupling a trigger pulse to said plurality of serially intercoupled trigger pulse delay means;

the respectively delayed trigger pulse emitted from the respective trigger pulse delay means coupled to the trigger pulse delay means associated complex strobe generator;

said second avalanche driver means coupling said trigger pulse to said plurality of trigger pulse delay means for causing respectively delayed trigger pulses to be coupled to the trigger pulse delay means associated complex strobe generator means whereby said complex strobe generator means couple respectively delayed relatively short duration time-limited strobe pulses to their associated strobe pulse drive lines and said first avalanche driver means coupling said strobe pulse to said strobe pulse drive line of said first set coincident with said sensor means coupling said transient signal to said serially intercoupled transient signal drive lines;

said strobe pulses coincident at their respectively associated detector means with a different relatively short duration sampled portion of said transient signal;

each of said detector means recording its respective transient signal sampled portion as a respective time-limited flux level.

5. A complex strobe generator for use in an environment of low to high intensity nuclear radiation bursts, comprising:

first and second semiconductor driver means, each having an input and an output terminal;

said first and second driver means output terminals intercoupled;

trigger means coupled only to said first driver means input terminal for coupling a trigger pulse thereto;

said first and second driver means concurrently coupling first and second opposite-polarity, substantially-similar, relatively self-cancelling strobe pulses, respectively, to said intercoupled terminals only when activated by said radiation burst;

said first driver means coupling its first strobe pulse to said intercoupled terminals when activated by said trigger pulse.

6. A complex strobe generator for use in an environment of low to high intensity nuclear radiation bursts, comprising:

said first and second driver means output terminals intercoupled at a common output terminal;

a magnetizable detector means coupled to said common output terminal and established in an initial saturated state;

trigger means coupled to only said first driver means input terminal for coupling a trigger pulse thereto;

said first and second driver means concurrently coupling first and second strobe pulses, respectively, to said detector means through said common output terminal only when activated by said radiation burst;

said first strobe pulse having a partial switching characteristic with respect to said detector means;

said first driver means coupling its first strobe pulse to said detector means through said common output terminal when activated by said trigger pulse;

said concurrent first and second strobe pulses having a negligible effect upon the initial saturated state of said detector means.

References Cited

UNITED STATES PATENTS

| | | | |
|---|---|---|---|
| 2,896,193 | 7/1959 | Herrmann | 340—174 |
| 3,086,118 | 4/1963 | Summerlin | 250—83.3 |
| 3,197,574 | 7/1965 | Zane | 179—100.1 |
| 3,281,811 | 10/1966 | Cotterman et al. | 340—214 |

RODNEY D. BENNETT, Jr., *Primary Examiner.*

CHARLES E. WANDS, *Assistant Examiner.*

U.S. Cl. X.R.

250—83.3